Aug. 17, 1926.
J. E. STAFFORD
ROTARY ENGINE
Filed Sept. 5, 1922
1,596,694
2 Sheets-Sheet 1
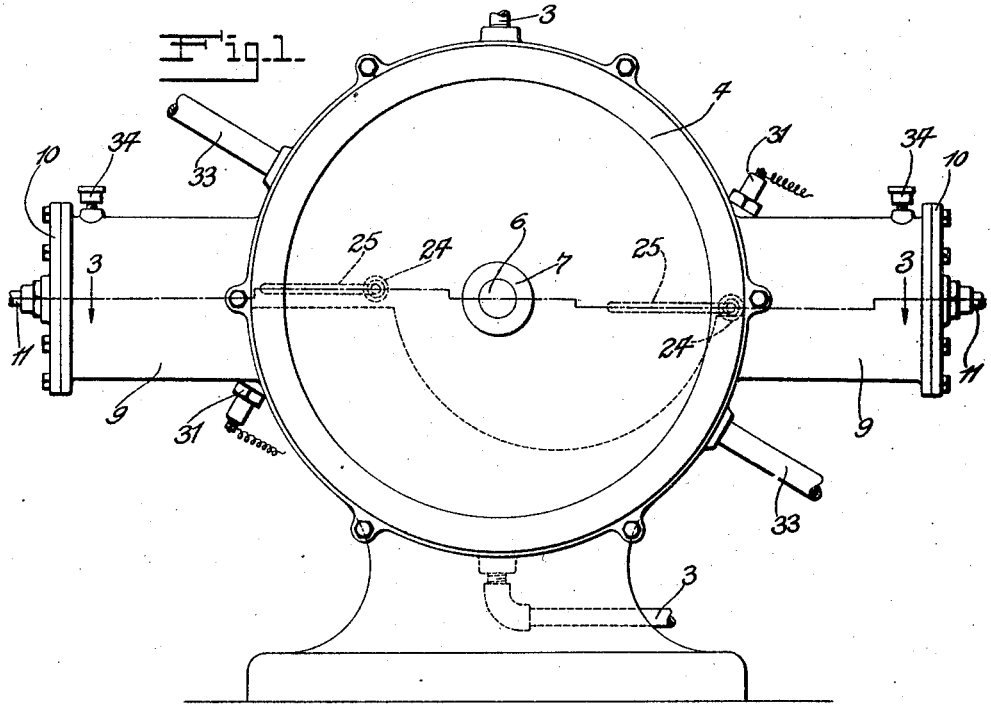
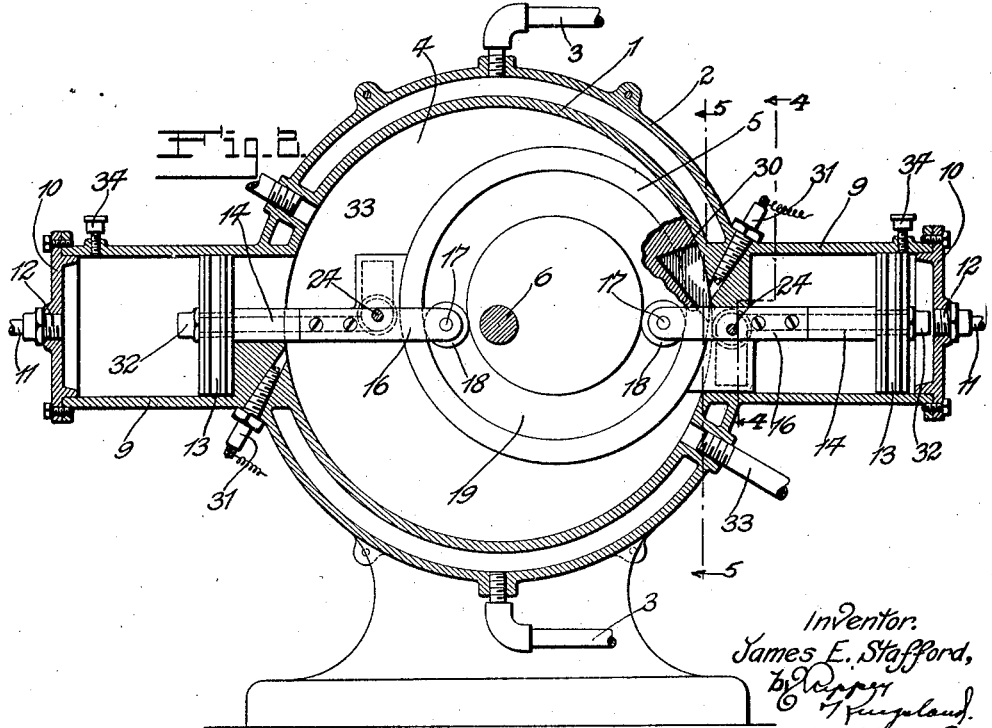
Inventor:
James E. Stafford,
by his Attorneys.

Aug. 17, 1926.
J. E. STAFFORD
ROTARY ENGINE
Filed Sept. 5, 1922    2 Sheets-Sheet 2
1,596,694
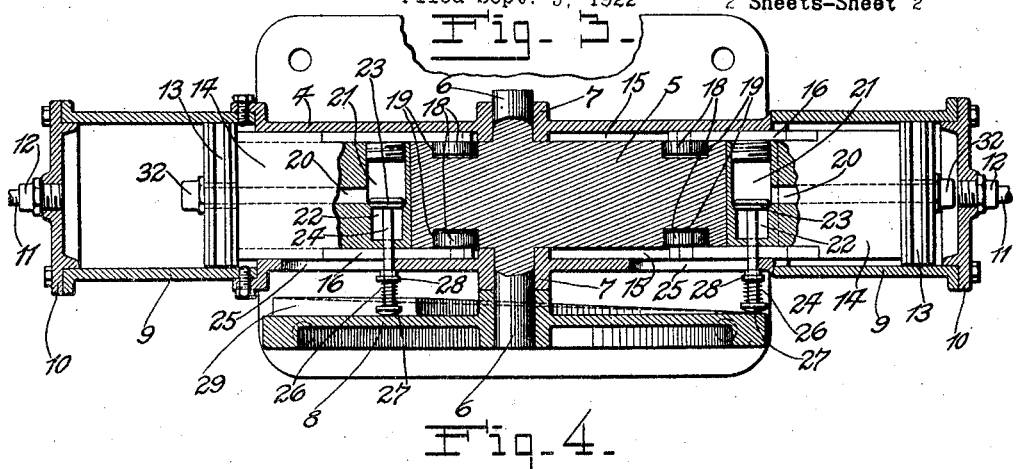
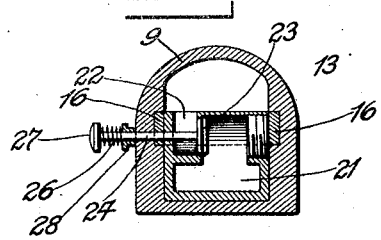
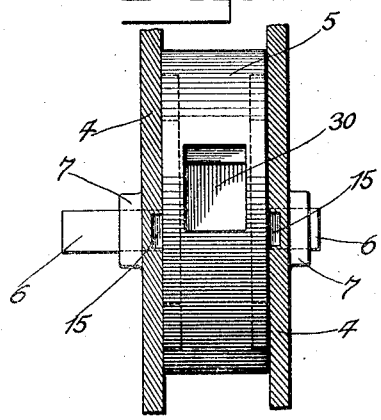
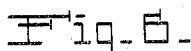
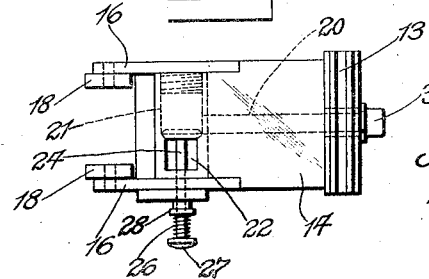
Inventor:
James E. Stafford,
by [signature]
His Attorneys.

Patented Aug. 17, 1926.

1,596,694

UNITED STATES PATENT OFFICE.

JAMES E. STAFFORD, OF WYNNE, ARKANSAS.

ROTARY ENGINE.

Application filed September 5, 1922. Serial No. 586,096.

This invention relates to rotary engine.

An object of the invention is to provide an improved rotary engine having novel and efficient means for controlling the admission of gas thereto.

Another object of the invention is to provide an improved rotary engine in which the rotor is directly connected with valve mechanism controlling the admission of gas.

Other objects will appear from the following description, reference being made to the drawings in which Fig. 1 is a side elevation of my improved engine.

Fig. 2 is a vertical sectional view transversely of the axis.

Fig. 3 is a horizontal sectional view on the line 3—3 of Fig. 1.

Fig. 4 is a sectional view on the line 4—4 of Fig. 2 of the valve device controlling the admission of gas.

Fig. 5 is a view on the line 5—5 of Fig. 2 showing the stator in section and the rotor in elevation.

Fig. 6 is a plan view of one of the valve devices removed from the engine.

The stator comprises a cylindrical body including an inner wall 1 and an outer wall 2 which are spaced from each other to form a confined space for the circulation of water passing through pipes 3. End wall plates 4 are attached to the cylindrical walls of the stator to complete the stator cylinder within which the rotor operates.

The rotor 5 is rigid or integral with trunnions 6 which are journaled in bearings 7 in the end plates 4 of the stator. The trunnions 6 are eccentric with respect to the axis of the rotor so that one point of the periphery of the rotor contacts with the inner peripheral surface of the inner wall 1 of the stator. A fly wheel 8 is attached to one of the trunnions 6.

The valve mechanism for controlling the admission of gas to the stator is in duplicate. A pair of tubular extensions 9 project from diametrically opposite sides of the stator and have their outer ends closed by end plates 10 bolted or otherwise secured thereto. A pipe 11 opens through each of the end plates 10 for the admission of gas, and are equipped with check valves 12 of familiar construction to permit gas to be drawn into the valve housings 9 and to prevent the passage of gas from the valve housings back into the pipes 11.

A piston head 13 is operatively mounted in each of the valve housings 9, being attached to the outer end of the connection 14. The connections 14 are in the form of plates or blocks, the width of which is equal to the diameter of the abutment housings 9 and in excess of the length of the stator. Said parts 14 constitute sliding abutments to hold the back pressure after combustion until the full stroke is completed. Grooves 15 are formed in the stator end walls 4 for the reception of the abutments 14. Extensions 16 (Fig. 6) on the inner end of each of the abutments 14 embrace the rotor between them. Each of the extensions 16 supports a pin 17 having a roller 18 mounted thereon. The rollers 18 operate in annular grooves 19 in the rotor as a result of which construction the sliding abutments 14 are reciprocated as an incident to the rotation of the rotor. A passage 20 through each of the piston heads 13 and through the attached abutment 14 opens into an enlarged pocket 21 near the inner end of each of the abutments 14. Each of the abutments 14 is provided with a port 22 (Figs. 4 and 6) for the purpose of admitting gas into the stator from the pockets 21. A valve 23 on a stem 24 is provided for controlling each of the ports 22. The stems 24 extend through slots 25 (Fig. 1) in one of the ends walls 4 of the stator and are actuated to draw the valve 13 to closed position by springs 26 encircling the valve stems and having their outer ends bearing against heads 27 on said stems and their inner ends against washers 28.

A cam 29 (Fig. 3) is formed on the inner side of the fly wheel 8 in position to engage the heads 27 of the valve stems and press said stems inwardly to open the valves 23 and thereby admit gas into the stator for compression and explosion in a pocket 30 (Fig. 2) in the rotor. The cam 29 is arranged to open the valve 23 during inward movement of the sliding abutment 13—14. Looking at Fig. 2 the rotor turns in a counter-clockwise direction, and looking at Fig. 3 it will be seen that the cam 29 has passed beyond and released the valve stem 24 at the left and is about to engage the valve stem 24 at the right. The gas having been compressed within the pocket 30 in the position shown in Fig. 2, explosion is caused by the ignition system of which the spark plug 31 is a part, there being one of said spark plugs for each of the sliding abutments.

Each of the piston heads 13 is equipped with a check valve 32 of familiar construction which opens as an incident to outward movement of the piston head 13 to permit the gas to pass through the passage 20 into the pocket 21 and which closes as an incident to inward movement of the piston head to prevent escape of the gas.

The stator is provided with diametrically opposite exhaust pipes 33. Familar lubricating means 34 is provided for each of the piston heads 13.

From the foregoing it will be seen that my invention is a complete and satisfactory mechanism for accomplishing all of its intended objects and purposes. The device is extremely simple and efficient in operation and the expense of manufacture is low. The construction and arrangement of the parts may be varied within equivalent limits without departure from the nature and principle of the invention.

I do not restrict myself unessentially, but what I claim and desire to secure by Letters Patent is:—

1. A rotary engine comprising a stator, a rotor within the stator having a combustion pocket in its periphery, a radial extension from the stator, a sliding abutment in said extension, means for operating said abutment by the rotor and holding said abutment in contact with the motor, a chamber in said abutment for receiving gas, a valve supported by the abutment for movement parallel with the axis of the rotor for controlling the passage of gas from said chamber into said combustion pocket, and a cam operated by the rotor for moving said valve in one direction.

2. A rotary engine comprising a stator having a slot in one wall thereof, a rotor within the stator having a combustion pocket in its periphery, a cylindrical extension from the stator, a sliding abutment in said extension, means for operating said abutment by the rotor and holding said abutment in contact with the rotor, a chamber in said abutment for receiving gas, means controlling the passage of gas into said chamber a valve in said chamber controlling the passage of gas from said chamber into said combustion pocket, a stem on said valve extending through said slot in said stator, a device operated by the rotor and engaging said stem to move said valve in a direction to permit gas to pass from said chamber into said pocket, and an element cooperating with said stem to move said valve to position to prevent gas from passing from said chamber into said combustion pocket.

3. A rotary engine comprising a stator having a slot in one wall thereof, a rotor within the stator having a combustion pocket in its periphery, a cylindrical extension from the stator, a sliding abutment in said extension, means for operating said abutment by the rotor and holding said abutment in contact with the rotor, a chamber in said abutment for receiving gas, means controlling the passage of gas into said chamber, a valve in said chamber controlling the passage of gas from said chamber into said combustion pocket, a stem on said valve extending through said slot in said stator, a device operated by the rotor and engaging said stem to move said valve in a direction to permit gas to pass from said chamber into said pocket, an element cooperating with said stem to move said valve to position to prevent gas from passing from said chamber into said combustion pocket, and a pump device operated by said abutment for forcing gas into said chamber and from said chamber into said combustion pocket.

4. A rotary engine, comprising a stator, a rotor within the stator having a combustion pocket in its periphery, a cylindrical extension from the stator, a sliding abutment in said extension, means for operating said abutment by the rotor and holding said abutment in contact with the rotor, a pump device operated by the abutment, a chamber in said abutment for receiving gas, a valve supported by the abutment for controlling the passage of gas from said chamber into the combustion pocket, a cam for operating said last-named valve, and means operated by the rotor for operating said cam.

JAMES E. STAFFORD.